US012654999B2

(12) United States Patent
Mathé et al.

(10) Patent No.: US 12,654,999 B2
(45) Date of Patent: Jun. 16, 2026

(54) CRANE, A VEHICLE WITH A CRANE, METHOD TO OPERATE A CRANE AND CIRCUITRY TO DETERMINE A USE OF A CRANE

(71) Applicant: Palfinger AG, Bergheim bei Salzburg (AT)

(72) Inventors: Ewald Mathé, Elixhausen (AT); Mario Hufnagl, Oberndorf bei Salzburg (AT); Clemens Rosenlechner, Salzburg (AT)

(73) Assignee: Palfinger AG, Bergheim bei Salzburg (AT)

( * ) Notice: Subject to any disclaimer, the term of this patent is extended or adjusted under 35 U.S.C. 154(b) by 146 days.

(21) Appl. No.: 18/592,921

(22) Filed: Mar. 1, 2024

(65) Prior Publication Data

US 2025/0276875 A1 Sep. 4, 2025

(51) Int. Cl.

*B66C 13/00* (2006.01)
*B66C 13/16* (2006.01)
*B66C 13/48* (2006.01)
*B66C 23/16* (2006.01)
*B66C 23/62* (2006.01)
*B66C 23/70* (2006.01)
*B66C 23/86* (2006.01)
*B66C 23/88* (2006.01)
*B66C 23/42* (2006.01)

(52) U.S. Cl.

CPC .............. *B66C 13/16* (2013.01); *B66C 13/48* (2013.01); *B66C 23/166* (2013.01); *B66C 23/62* (2013.01); *B66C 23/705* (2013.01); *B66C 23/86* (2013.01); *B66C 23/88* (2013.01); *B66C 23/42* (2013.01); *B66C 2700/067* (2013.01)

(58) Field of Classification Search

CPC ......... B66C 13/16; B66C 13/48; B66C 13/50; B66C 15/06; B66C 15/065; B66C 23/62; B66C 23/705; B66C 23/86; B66C 23/88; B66C 23/82; B66C 2700/067

See application file for complete search history.

(56) References Cited

U.S. PATENT DOCUMENTS

| | | | | |
|---|---|---|---|---|
| 3,645,407 A * | 2/1972 | Przybylski | B66C 23/90 | 212/281 |
| 2014/0263142 A1* | 9/2014 | Billiot | F16F 1/48 | 267/141 |
| 2019/0031474 A1* | 1/2019 | Stilborn | B66C 23/00 | |
| 2022/0098008 A1* | 3/2022 | Minami | B66C 13/063 | |

FOREIGN PATENT DOCUMENTS

| | | | |
|---|---|---|---|
| AU | 2017353114 B2 * | 10/2019 | B66C 23/54 |
| KR | 20110030357 A * | 3/2011 | B66C 23/905 |
| KR | 20230088125 A * | 6/2023 | B66C 23/78 |

* cited by examiner

*Primary Examiner* — Emmanuel M Marcelo

(74) *Attorney, Agent, or Firm* — 2SPL Patent Attorneys PartG mbB; Kieran O'Leary

(57) ABSTRACT

A crane (100) comprises a boom (110) rotatable about a pivot (120) between a crane base (130) and the boom (110) and a winch arrangement (150) mounted movable with respect to the boom (110). A load weighting element (160) is mounted between the boom (110) and the winch arrangement (150).

20 Claims, 4 Drawing Sheets

CRANE, A VEHICLE WITH A CRANE, METHOD TO OPERATE A CRANE AND CIRCUITRY TO DETERMINE A USE OF A CRANE

FIELD

Examples relate to cranes and their use and to methods to operate a crane as well as to methods to determine a present use of the crane.

BACKGROUND

There are multiple types of cranes in the market. Immobile cranes are often used for heavy lifting on construction sites. Apart from immobile cranes, there is also a great variety of mobile cranes mounted on a movable chassis, such as for example on a truck. An issue of permanent concern is safety. One aspect of safety is to avoid overload conditions causing damage to the crane and, in a worst-case scenario, even destroying the crane and doing harm to the workers around. Mobile cranes may include loader cranes, wherein the base of the crane is mounted on a truck. The base of the crane can be a base assembly rotatable about a vertical axis and comprising a hinge (knuckle joint) having attached thereto the boom of the crane. In simpler configurations, the base assembly may not be rotatable about the vertical axis. Often, the base assembly comprises a vertically extending column or element to which the boom is attached. Further, cranes come in different configurations. For example, a crane having at least a single boom and multiple or several extensions that can be hydraulically operated to extend the length of the boom, may have a simple hook on its tip to carry loads. Other crane configurations may include a winch that can be used to lift and lower payload without the boom of the crane itself having to move. In crane configurations having winches, there is a demand to improve solutions for determining the load presently carried by the crane

SUMMARY

An example relates to a crane comprising a boom rotatable about a pivot between a crane base and the boom. A winch arrangement is mounted movable with respect to the boom and a load weighting element mounted between the boom and the winch arrangement. Allowing movement between the winch arrangement and the boom may result in an increased accuracy of the determination of the load attached to a cable of the winch.

BRIEF DESCRIPTION OF THE FIGURES

Some examples of apparatuses and/or methods will be described in the following by way of example only, and with reference to the accompanying figures, in which.

DETAILED DESCRIPTION

Figure 1:
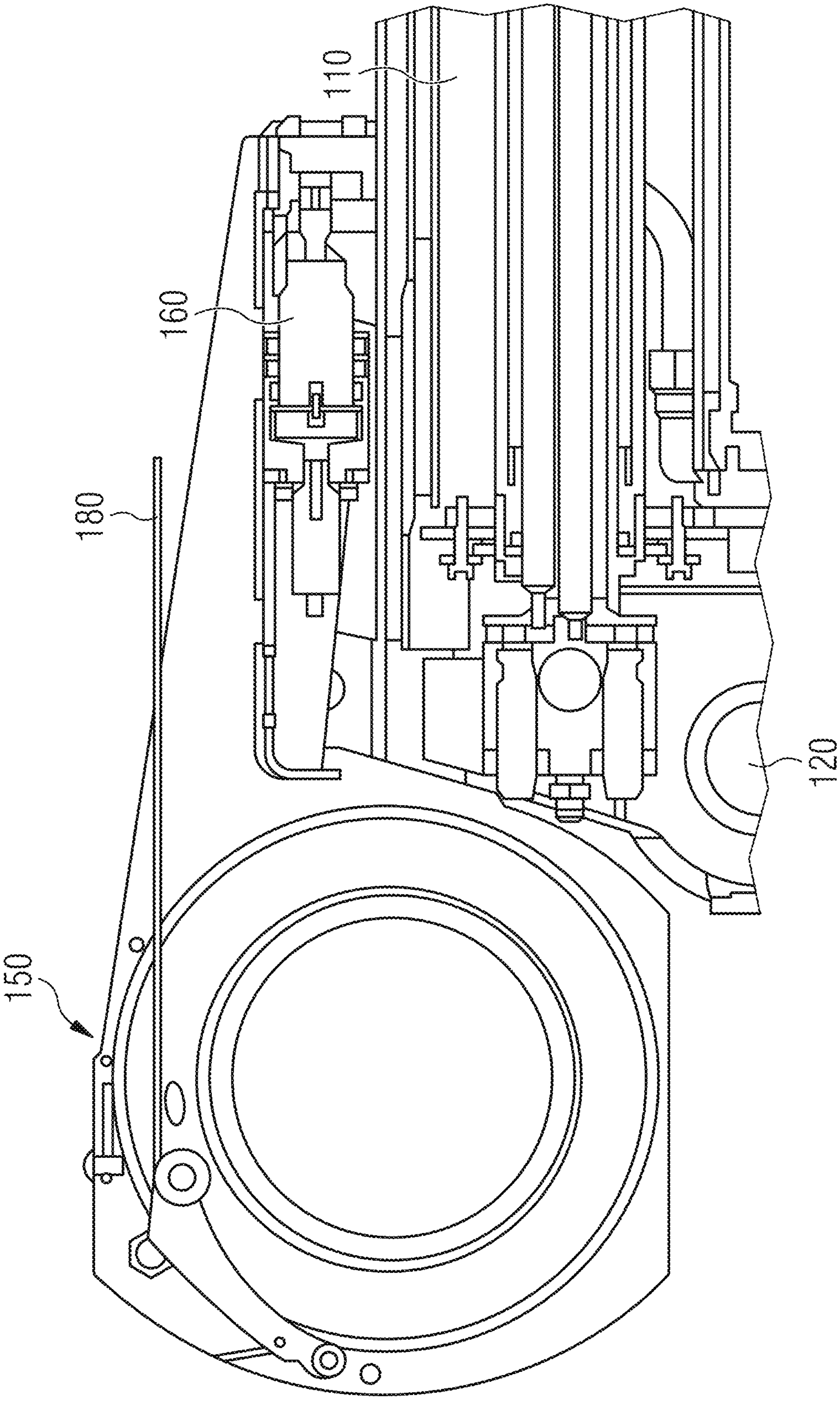
FIG. 1 illustrates a sectional view of a winch arrangement mounted to the boom od a crane according to an example

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an "or", this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

Figure 2:
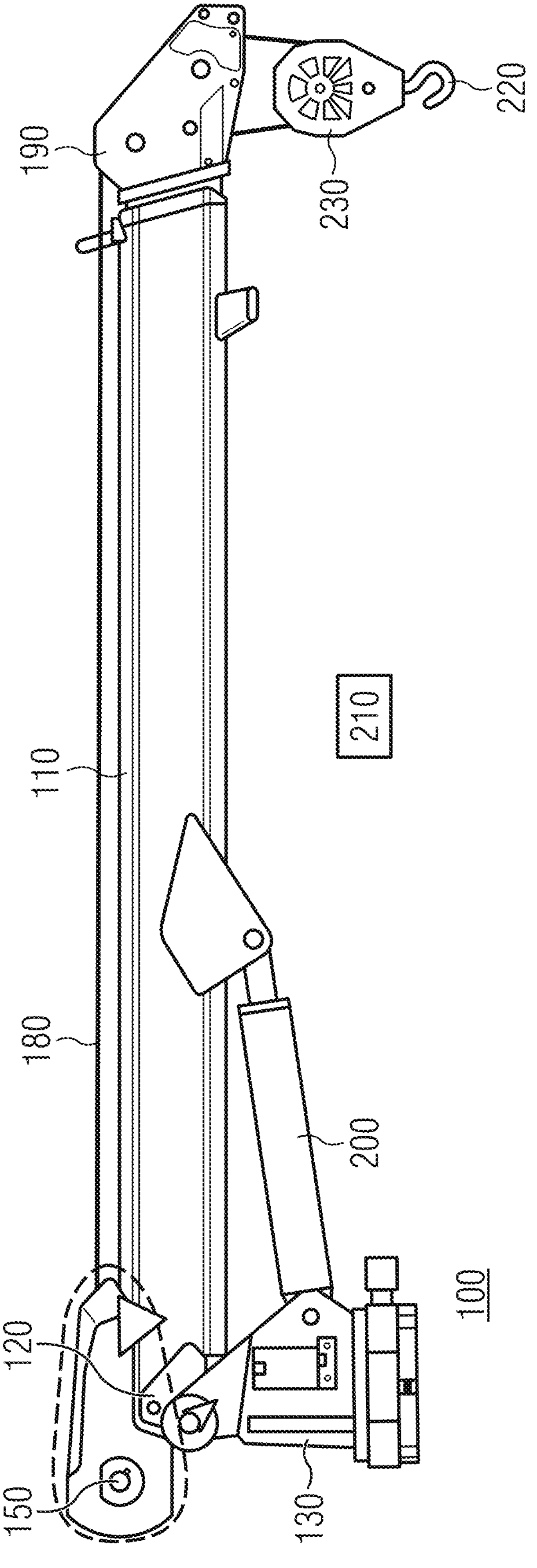
FIG. 2 illustrates a mobile crane according to an example in a first orientation.
Figure 3:
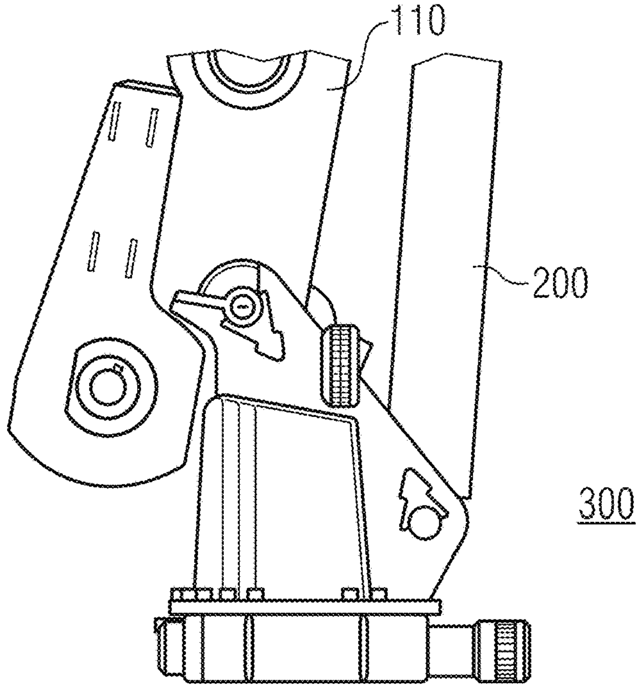
FIG. 3 illustrates a second orientation of the crane of FIG. 2.
Figure 4:
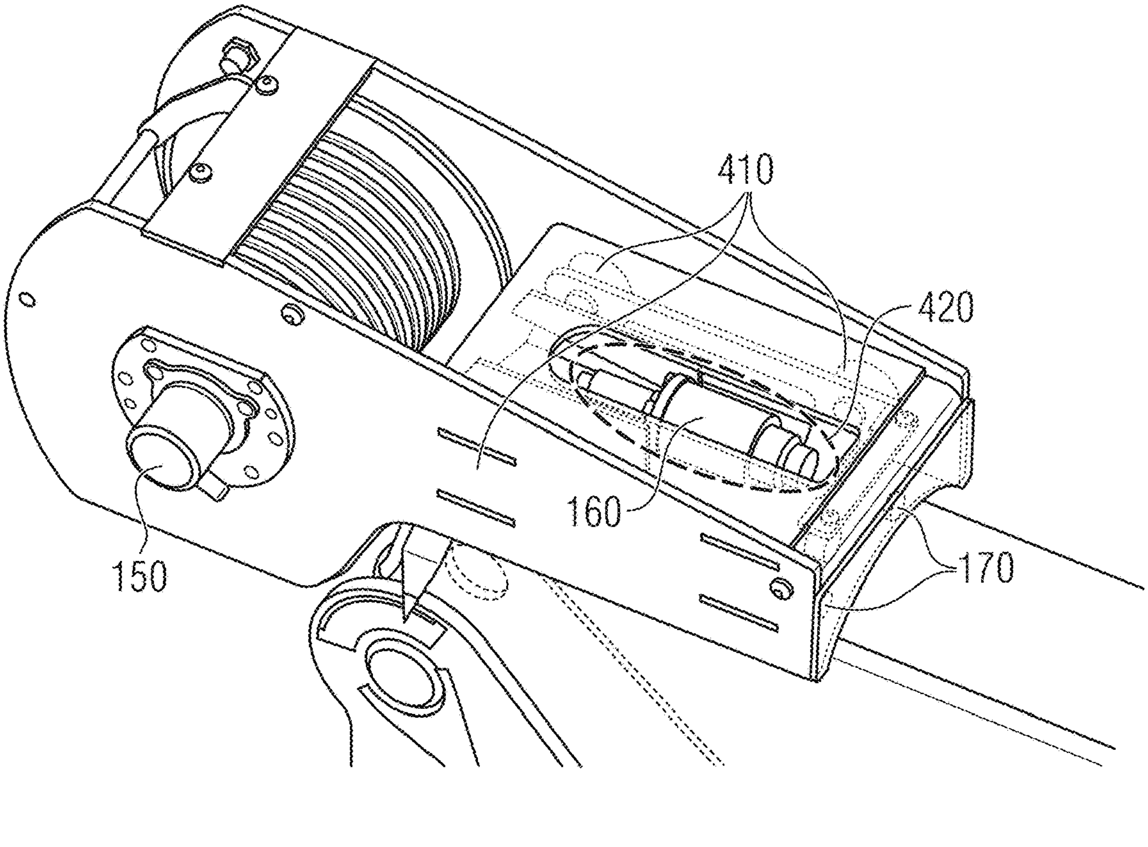
FIG. 4 illustrates an isometric view of another example of a crane.
Figure 5:
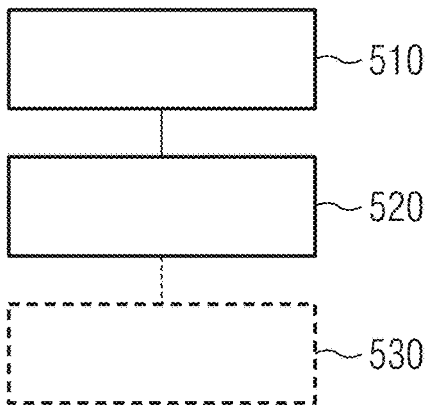
FIG. 5 illustrates a flow chart of an example of a method to operate a crane.
Figure 6:
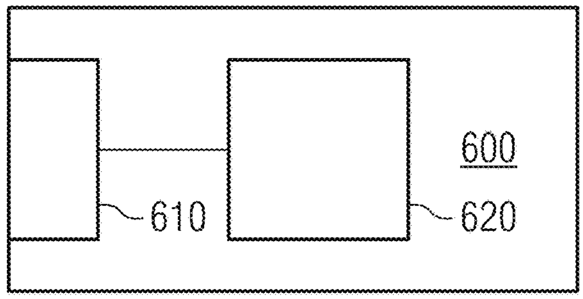
FIG. 6 illustrates a block diagram of circuitry for determining a use of a crane.
Figure 7:
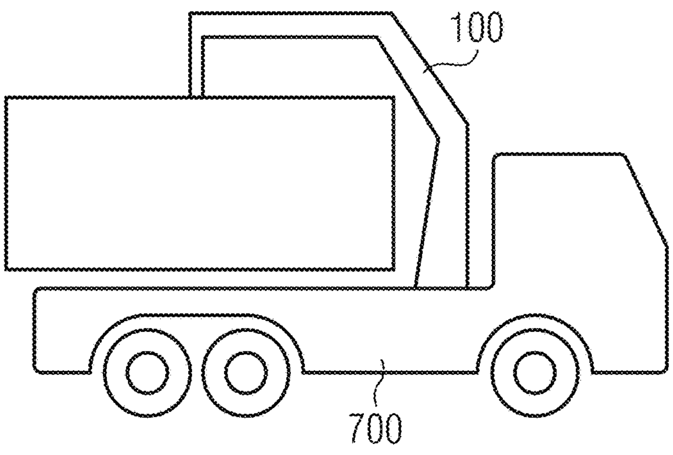
FIG. 7 illustrates a truck having mounted thereon an example of a crane.

FIG. 1 illustrates a sectional view of a winch arrangement mounted to the boom on a crane according to an example;

FIG. 2 illustrates a mobile crane according to an example in a first orientation;

FIG. 3 illustrates a second orientation of the crane of FIG. 2;

FIG. 4 illustrates an isometric view of another example of a crane;

FIG. 5 illustrates a flow chart of an example of a method to operate a crane;

FIG. 6 illustrates a block diagram of circuitry for determining a use of a crane; and FIG. 7 illustrates a truck having mounted thereon an example of a crane.

FIGS. 1 to 4 illustrate different views of a winch arrangement 150 mounted on a crane 100 according to an example as well as a full view of the crane 100 in FIG. 2. Those figures are subsequently jointly used to discuss several aspects of the examples described in this document.

The crane 100 comprises a boom 110 that is rotatable about a pivot 120 between a crane base 130 and the boom 110. A winch arrangement 150 is mounted movable with respect to the boom 110. According to an example, a load weighting element 160 is mounted between the boom 110 and the winch arrangement 150. As illustrated in FIG. 7, a crane 100 according to an example may be mounted on a truck or any other kind of vehicle. However, the examples subsequently described herein may likewise be implemented with arbitrary other crane types. In crane configurations having winch arrangements, a force or a tension on the cable of the winch arrangement may be used to determine the load presently carried by the crane. In the illustrated example, the winch arrangement 150 is movable in parallel to a linear extension of the boom 110. Relative movement may, for example, be enabled by linear slides 410 or by a hinge mechanism supporting linear movement. A cable 180 extends from the winch arrangement 150 over the tip of the boom 110, supporting a hook 220 to carry loads.

In the illustrated example, the boom 110 of the crane 100 is extensible using at least one hydraulic extension 190 arranged telescopically within the boom 110.

At least one hydraulic jack 200 is operated to rotate the boom 110 about the pivot 120. To this end, the hydraulic jack 200 may be connected between the base 130 and the boom 110.

Since movement is principally allowed between the winch arrangement 150 and the boom 110, a load attached to a cable 180 of the winch arrangement 150 may be determined with higher accuracy than with conventional approaches. For example, if the winch arrangement 150 is not movable with respect to the boom 110, a load might otherwise also be determined via the torque on the shaft of the drum of the winch arrangement 150. However, said measurement and subsequent calculation additionally require the position of the rope on the drum (the radius of the outermost winding), which is prone to significant errors.

As illustrated in FIGS. 1 and 4, the load weighting element 160 may comprise a hydraulic cylinder having a sensor to measure the pressure of the fluid in the cylinder to conclude on the force acting on the cylinder. Such a solution may provide for a highly reliable measurement that is robust against degradation even in the tough working environment of a crane 100.

According to some examples, the crane 100 optionally further comprises a spring mechanism 170 between the winch arrangement 150 and the boom 110. The spring mechanism 170 may be any kind of spring mechanism reacting with force on an elongation and that is designed rigidly enough to carry the loads of the particular crane 110. The spring mechanism 170 may be used to further control the relative movement between the winch arrangement 150 and the boom 110 to result with a more accurate measurement.

According to some examples, the spring mechanism 170 is optionally further configured to compensate a weight of the winch arrangement 150 based on the rotation of the boom 110 about the pivot 120. For example, FIG. 3 illustrates the crane in a fully vertical position 300 of the boom 110. The fully vertical position is the maximum possible extent the boom 110 can be rotated in an upright or vertical position. The more the boom 110 is rotated into a vertical position, the more the weight of the winch arrangement 150 contributes to the force measured by the load weighting element 160. Since the load itself doesn't change, an increasing contribution could eventually degrade the accuracy of the measurement if the compensating spring mechanism 170 was not present. Without the compensation, the weight of the winch arrangement 150 would result in the load to be estimated too little in the vertical position. This is undesirable since one is then required to implement greater safety margins in order to prevent the crane to end up in an overload situation. In other words, the full mechanical potential of the crane may not be used since one would be required to foresee a safety margin due to uncompensated weight of the winch arrangement 150. Said disadvantage, which is for example also existent if one measures the force acting on the winch arrangement 150 with a load cell, can be avoided using spring mechanism 170.

According to some examples, the spring mechanism 170 is configured such that the weight of the winch arrangement 150 in the fully vertical position 300 of the boom 110 causes a variation of a load measured by the load weighting element 160 by less than 5% as compared to the load measured in a horizontal position of the boom 110. According to some examples, the variation is less than 10%, 15%, or less than 20%.

According to some examples, a pre-tension or pre-load of the spring mechanism 170 is optionally adjustable to accurately adjust the compensation force during calibration or to allow re-calibration of the system to account for degradation such as for example a change of stiffness of the spring mechanism 170. In the example illustrated in FIG. 4, the pre-load of the spring mechanism 170 can be adjusted by means of a single screw 420.

If the load on the winch arrangement 150 and, hence, on the cable 180 can be determined, one can implement safety mechanisms, such as for example an automated shutdown when the maximum load of the crane is reached.

To this end, the crane 100 (the software controlling the crane) or further control equipment such as for example a remote control of the crane can optionally comprise monitoring circuitry 210 configured to receive a weight signal from the load weighting element 160. The monitoring circuitry 210 may generate an alarm signal when the weight signal fulfills an alarm criterion. In other words, the alarm signal is generated when the weight signal fulfills an alarm criterion. Depending on the alarm criterion chosen, multiple actions may be triggered. For example, if the alarm criterion is chosen to indicate an upcoming overload scenario, optical or acoustical warnings may be generated to notify a user of the crane of an upcoming critical situation. If the alarm signal is generated once the overload scenario is already present, an automatic shutdown of the crane may be triggered. In other words, the alarm signal may cause an operation of the winch arrangement 150 or of the entire crane 110 to stop.

In order to conclude on an overload scenario, the control circuit may optionally make use of further information, such as for example the vertical position of the boom 110 or the extent to which a hydraulic extension 190 is used to extend the overall length of the crane 110. If the geometry of the crane is additionally considered, one may, for example, calculate a momentum acting on the base 130 of the crane 100 to determine a load threshold that must not be exceeded in order to prevent the crane from falling over.

In some examples, the alarm criterion is fulfilled if the weight signal is indicative of a load of a cable 180 of the winch arrangement 150 that is above a load threshold.

In FIG. 2, the crane 110 is illustrated in "two wire operation". That is, the cable 180 of the winch arrangement 150 is fixed to the tip of the crane 110 and the load is attachable to a hook 220 that is fixed to a pulley 230. This is the principle of a double purchase pulley. In this configuration, the force generated on the winch arrangement 150 by a load is only have the force caused by the same load directly attached to the end of the cable 180 (i.e. not using a pulley), which is also called "single cable operation".

In order to not underestimate the load in two wire operation, the monitoring circuitry of some examples may optionally further receive a pressure signal from the hydraulic jack 220 rotating the boom 110 about the pivot 120.

The pressure in the hydraulic jack 200 is also dependent from the load presently lifted by the crane. Although the pressure may have further dependencies on the geometry of the crane and not be a measurement quantity suitable to determine the load of the crane 100 with an accuracy similar to the one of the weighting element 160, it may serve to automatically distinguish between single wire operation and dual wire operation. This is because the difference of the load to be estimated using the weighting element 160 and the pressure signal is as much as a factor of two. According to some examples, the monitoring circuitry 210 is, therefore, configured to determine a first value for the load threshold if a relation between the weight signal and the pressure signal fulfills a first criterion, and to determine a second value of the load threshold if the relation between the weight signal and the pressure signal fulfills a second criterion. In some examples, the load threshold may be lowered by a factor of approximately two if the monitoring circuitry 210 determines "two wire operation" as compared to the load threshold used for "single wire operation", considering that the load threshold is applied to the load determined by means of the weighting element 160. The monitoring circuitry 210 may, for example, conclude on "two wire operation" if a ratio between the pressure signal and the weight signal is above a predetermined threshold.

FIG. 5 illustrates a flow chart of an example of a method to operate a crane.

The method comprises rotating 510 a boom about a pivot between a crane base and the boom.

The method further comprises measuring a force 520 between a winch arrangement and the boom, the winch arrangement being movably mounted with respect to the boom.

Optionally, the method further comprises compensating 530 a weight of the winch arrangement in the measured force based on the rotation of the boom about the pivot.

FIG. 6 illustrates a block diagram of circuitry 600 for determining a use of a crane. Said circuitry may, for example, be implemented within monitoring circuitry 210 illustrated in FIG. 2.

Circuitry 600 comprises an input interface 610 configured to receive pressure information indicating the pressure within a hydraulic jack used to rotate a boom about a pivot between a crane base and the boom. The input interface is further configured to receive force information indicating a force between a winch arrangement and the boom, the winch arrangement being movably mounted with respect to the boom.

Evaluation circuitry 620 is configured to distinguish between a first use of the crane and a second use of the crane based on the pressure information and the force information.

The first use may correspond to a use where a load is attached to a tip of a cable of the winch arrangement. The second use may correspond to a use where the tip of the cable is attached to the crane and the load is attached to a pulley.

The evaluation circuitry may be configured to determine the first use if a relationship between the pressure and the force is below a threshold.

FIG. 7 illustrates a vehicle 700 having mounted thereon an example of a crane 100. In the schematic illustration, the crane 100 is a loader crane to lift loads from ground and to place them on the vehicle. Further examples may, of course, also use examples of cranes for other purposes.

In summary, some of the examples described herein provide for at least one of the following advantages. Force measurement of the goods to be lifted can be performed reliably and in real time. Shutdown can be triggered or caused when a maximum load is reached. Self-weight compensation of the winch arrangement mounted on the crane arm (boom) can be performed when the boom is vertically rotated about an axis. An adjustable, fully integrated spring package for dead weight compensation can be used easily so that "too little" is never displayed during measurement. The examples can be implemented in a very cost-effective design that is furthermore virtually maintenance-free. The examples are Low weight and enable a reliable measurement when using a hydraulic measuring unit. In the event of damage, the components are easily replaceable.

In the following, some examples of the proposed concept are presented:

An example (e.g., example 1) relates to a crane comprising a boom rotatable about a pivot between a crane base and the boom, a winch arrangement mounted movable with respect to the boom, and a load weighting element mounted between the boom and the winch arrangement.

Another example (e.g., example 2) relates to a previous example (e.g., example 1) or to any other example, further comprising a spring mechanism between the winch arrangement and the boom.

Another example (e.g., example 3) relates to a previous example (e.g., example 2) or to any other example, further comprising that the spring mechanism is configured to compensate a weight of the winch arrangement based on the rotation of the boom about the pivot.

Another example (e.g., example 4) relates to a previous example (e.g., example 3) or to any other example, further comprising that the spring mechanism is configured such that the weight of the winch arrangement in a fully vertical position of the boom causes a variation of a load measured by the load weighting element by less than 5% as compared to the load measured in a horizontal position of the boom.

Another example (e.g., example 5) relates to a previous example (e.g., one of the examples 1 to 4) or to any other example, further comprising that the load weighting element comprises a hydraulic cylinder.

Another example (e.g., example 6) relates to a previous example (e.g., one of the examples 1 to 5) or to any other example, further comprising that the winch arrangement is movable in parallel to a linear extension of the boom.

Another example (e.g., example 7) relates to a previous example (e.g., one of the examples 1 to 6) or to any other example, further comprising a cable extending from the winch arrangement over the tip of the boom, the cable comprising a hook to fasten loads at.

Another example (e.g., example 8) relates to a previous example (e.g., one of the examples 1 to 7) or to any other example, further comprising that the boom is extensible using at least one hydraulic extension arranged telescopically within the boom.

Another example (e.g., example 9) relates to a previous example (e.g., one of the examples 1 to 8) or to any other example, further comprising at least one hydraulic jack configured to rotate the boom about the pivot.

Another example (e.g., example 10) relates to a previous example (e.g., one of the examples 1 to 9) or to any other example, further comprising monitoring circuitry configured to receive a weight signal from the load weighting element and to generate an alarm signal when the weight signal fulfills an alarm criterion.

Another example (e.g., example 11) relates to a previous example (e.g., example 10) or to any other example, further comprising that the alarm criterion is fulfilled if the weight signal is indicative of a load of a cable of the winch arrangement that is above a load threshold.

Another example (e.g., example 12) relates to a previous example (e.g., example 11) or to any other example, further comprising that the monitoring circuitry is further configured to receive a pressure signal from an hydraulic jack configured to rotate the boom about the pivot, and to determine a first value of the load threshold if a relation between the weight signal and the pressure signal fulfills a first criterion, and to determine a second value of the load threshold if the relation between the weight signal and the pressure signal fulfills a second criterion.

Another example (e.g., example 13) relates to a previous example (e.g., one of the examples 1 to 12) or to any other example, further comprising that the alarm signal causes an operation of the winch arrangement to stop.

Another example (e.g., example 14) relates to a previous example (e.g., one of the examples 1 to 12) or to any other example, wherein the cable winch arrangement is mounted between the pivot of the boom and a tip of the crane.

An example (e.g., example 15) is a vehicle having mounted thereon a crane according to any one of examples 1 to 14.

An example (e.g., example 16) relates to a method to operate a crane, comprising rotating a boom about a pivot between a crane base and the boom, Measuring a force between a winch arrangement and the boom, the winch arrangement being movably mounted with respect to the boom.

Another example (e.g., example 17) relates to a previous example (e.g., example 16) or to any other example, further comprising compensate a weight of the winch arrangement in the measured force based on the rotation of the boom about the pivot.

Another example (e.g., example 18) relates to a previous example (e.g., one of the examples 16 or 17) or to any other example, further comprising generating an alarm signal when the force fulfills an alarm criterion.

Another example (e.g., example 19) relates to a previous example (e.g., example 18) or to any other example, further comprising that the alarm criterion is fulfilled if the force is indicative of a load on a cable of the winch arrangement that is above a load threshold.

Another example (e.g., example 20) relates to a previous example (e.g., example 19) or to any other example, further comprising measuring a pressure in an hydraulic jack configured to rotate the boom about the pivot, and determining a first value of the load threshold if a relation between the force and the pressure fulfills a first criterion, and to determine a second value of the load threshold if the relation between the force and the pressure fulfills a second criterion.

Another example (e.g., example 21) relates to a previous example (e.g., one of the examples 18 to 20) or to any other example, further comprising stopping operation of the winch arrangement at the presence of the alarm signal.

An example (e.g., example 22) relates to circuitry configured to determine a use of a crane, comprising an input interface configured to receive pressure information indicating the pressure within a hydraulic jack used to rotate a boom about a pivot between a crane base and the boom, and force information indicating a force between a winch arrangement and the boom, the winch arrangement being movably mounted with respect to the boom, and evaluation circuitry configured to distinguish between a first use of the crane and a second use of the crane based on the pressure information and the force information.

Another example (e.g., example 23) relates to a previous example (e.g., example 22) or to any other example, further comprising that the first use corresponds to a use where a load is attached to a tip of a cable of the winch arrangement, and wherein the second use corresponds to a use where the tip of a cable is attached to the crane and the load is attached to a pulley.

Another example (e.g., example 24) relates to a previous example (e.g., example 23) or to any other example, wherein the evaluation circuitry is configured to determine the first use if a relationship between the pressure and the force is below a threshold.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. A crane (100), comprising: a boom (110) rotatable about a pivot (120) between a crane base (130) and the boom (110); a winch arrangement (150) arranged movable with respect to the boom (110); and a load weighting element (160) arranged between the boom (110) and the winch (150).

2. The crane (100) of claim 1, further comprising a spring mechanism (170) between the winch arrangement (150) and the boom.

3. The crane (100) of claim 2, wherein the spring mechanism (170) is configured to compensate a weight of the winch arrangement (150) based on the rotation of the boom (110) about the pivot (120).

4. The crane (100) of claim 3, wherein the spring mechanism (170) is configured such that the weight of the winch arrangement (150) in a fully vertical position (300) of the boom (110) causes a variation of a load measured by the load weighting element (160) by less than 10% as compared to the load measured in a horizontal position of the boom (110).

5. The crane (100) of claim 1, wherein the load weighting element (160) comprises a hydraulic cylinder.

6. The crane (100) of claim 1, wherein the winch arrangement (150) is movable with respect to a linear extension of the boom (110).

7. The crane (100) of claim 1, further comprising a cable (180) extending from the winch arrangement (150) over a tip of the boom (110), the cable (180) being connectable to a load block.

8. The crane (100) of claim 1, wherein the boom (110) is extensible using at least one hydraulic extension (190) arranged telescopically within the boom (110).

9. The crane (100) of claim 1, further comprising at least one hydraulic jack configured (200) to rotate the boom (110) about the pivot (120).

10. The crane (100) of claim 1, further comprising: monitoring circuitry (210) configured to receive a weight signal from the load weighting element (160) and to generate an alarm signal based on the weight signal fulfilling an alarm criterion.

11. The crane (100) of claim 10, wherein the alarm criterion is fulfilled if the weight signal is indicative of a load of a cable (180) of the winch arrangement (150) that is above a load threshold.

12. The crane (100) of claim 11, wherein the monitoring circuitry is further configured to receive a pressure signal from a hydraulic jack configured to rotate the boom (110) about the pivot (120), and to determine a first value of the load threshold if a relation between the weight signal and the pressure signal fulfills a first criterion, and to determine a second value of the load threshold if the relation between the weight signal and the pressure signal fulfills a second criterion.

13. The crane (100) of claim 10, wherein the alarm signal causes an operation of the winch arrangement (150) to stop.

14. A vehicle (700) having mounted thereon a crane (100) according to claim 1.

15. A method to operate a crane (100), comprising:

rotating (510) a boom (110) about a pivot (120) between a crane base and the boom (110);

measuring a force (520) between a winch arrangement (150) and the boom (110), the winch arrangement (150) being movably mounted with respect to the boom (110).

16. The method of claim 15, further comprising:

compensating a weight (530) of the winch arrangement (150) in the measured force based on the rotation of the boom (110) about the pivot (120).

17. The method of claim 15, further comprising: generating an alarm signal when the force fulfills an alarm criterion.

18. The method of claim 17, wherein the alarm criterion is fulfilled if the force is indicative of a load on a cable of the winch arrangement (150) that is above a load threshold.

19. The method of claim 18, further comprising: measuring a pressure in an hydraulic jack (200) configured to rotate the boom (110) about the pivot (120), and determining a first value of the load threshold if a relation between the force and the pressure fulfills a first criterion, and to determine a second value of the load threshold if the relation between the force and the pressure fulfills a second criterion.

20. The method of claim 17, further comprising: stopping operation of the winch arrangement (150) at the presence of the alarm signal.

* * * * *